Figure 7:
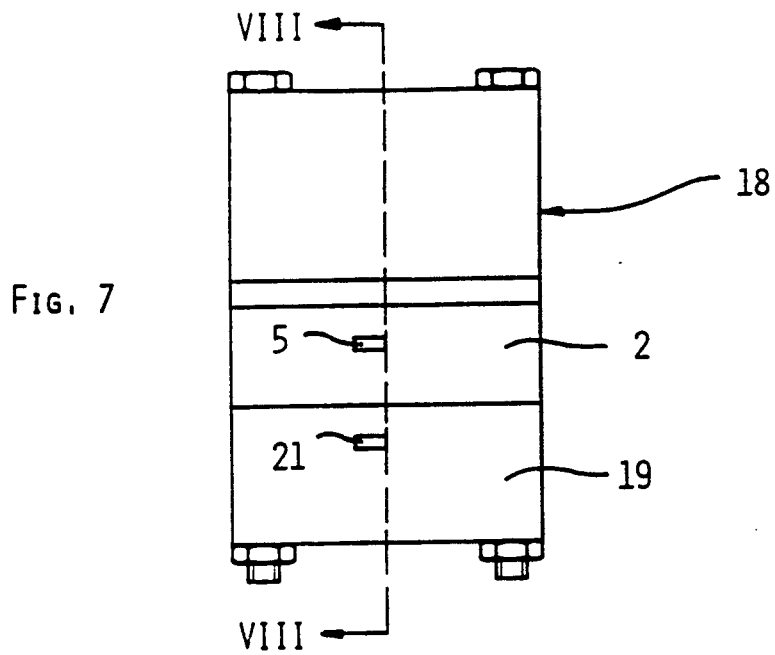

United States Patent [19]
Kristoffer

[11] Patent Number: 5,238,023
[45] Date of Patent: Aug. 24, 1993

[54] VALVE APPARATUS
[75] Inventor: Kristoffer, H. Olofsson Huddinge, Sweden
[73] Assignee: Alfa-Laval Agri International AB, Sweden
[21] Appl. No.: 941,074
[22] PCT Filed: May 21, 1991
[86] PCT No.: PCT/SE91/00359
  § 371 Date: Oct. 15, 1992
  § 102(e) Date: Oct. 15, 1992
[87] PCT Pub. No.: WO91/19123
  PCT Pub. Date: Dec. 12, 1991
[30] Foreign Application Priority Data
  May 31, 1990 [SE] Sweden .................. 9001954
[51] Int. Cl.$^5$ ................................. F16K 7/18
[52] U.S. Cl. ................... 137/596.17; 251/14; 251/129.03; 251/129.11; 251/901
[58] Field of Search .............. 137/471, 484.2, 495, 137/596.17; 251/14, 129.03, 129.11, 901

[56] References Cited
U.S. PATENT DOCUMENTS

| 70,511 | 11/1867 | Bourden | 251/901 X |
| 3,771,563 | 11/1973 | Hayner | 251/901 X |
| 4,350,320 | 9/1982 | Stahle | 251/901 X |
| 4,520,516 | 6/1985 | Parsons | 251/129.03 X |
| 4,546,338 | 10/1985 | Idogaki et al. | 251/129.11 X |
| 4,559,971 | 12/1985 | Bradshaw | 137/596.11 |
| 4,770,201 | 9/1988 | Zakai | 251/901 X |
| 4,957,274 | 9/1990 | Hood et al. | 251/129.11 X |

FOREIGN PATENT DOCUMENTS 82-01924  6/1982  World Int. Prop. O. .

Primary Examiner—John Rivell
Attorney, Agent, or Firm—Hovey, Williams, Timmons & Collins

[57] ABSTRACT

A valve apparatus comprises at least one valve device having a chamber, an inlet and an outlet. A moveable member in the chamber is arranged to displace a membrane such that the membrane is rolled against the wall of the chamber between a closing position at which the membrane covers the opening of the outlet and an opening position at which the opening of the outlet is uncovered. A flow passage is formed for a fluid to flow from the inlet to the outlet. The moveable member is provided with an entrainment member arranged to extend into and be displaced in the flow passage during at least a substantial part of the displacement of the membrane between closing and opening positions.

7 Claims, 3 Drawing Sheets

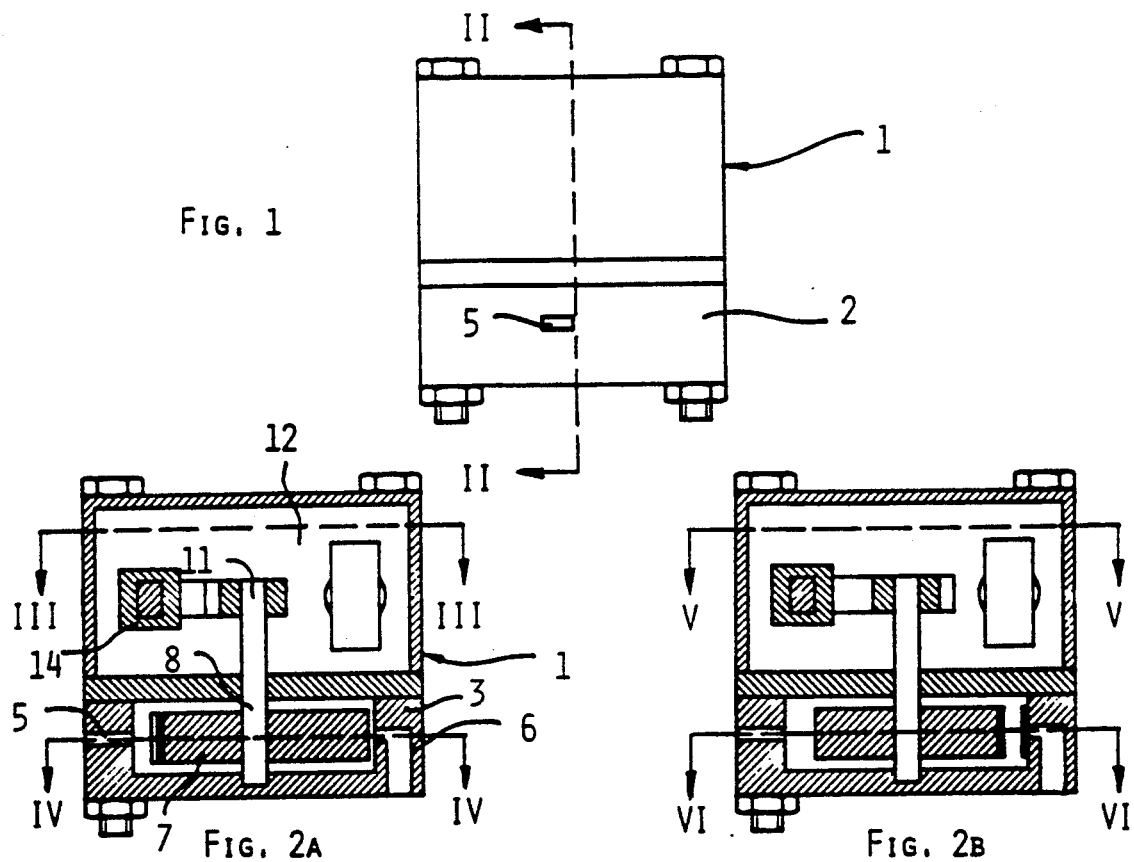
FIG. 1
FIG. 2A
FIG. 2B
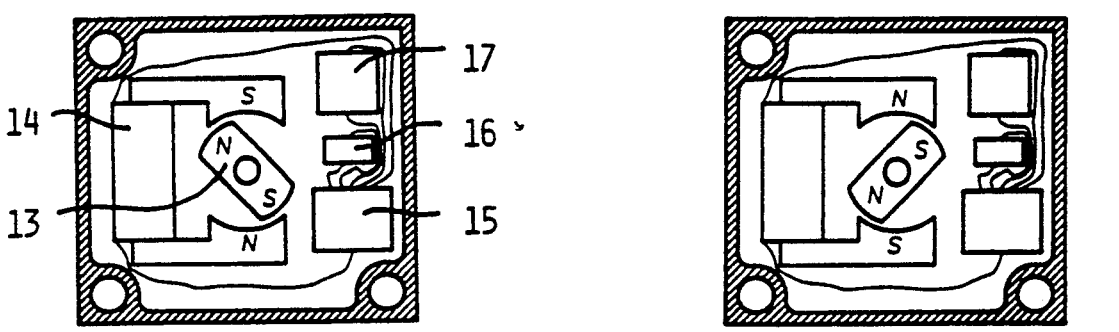
FIG. 3
FIG. 5
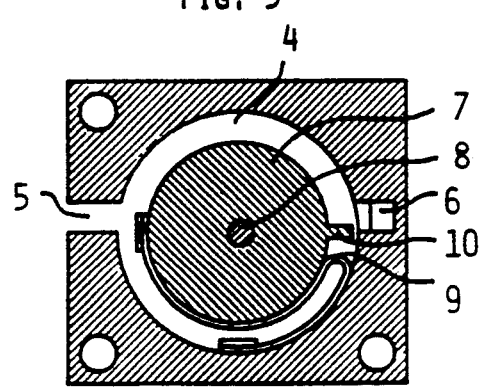
FIG. 4
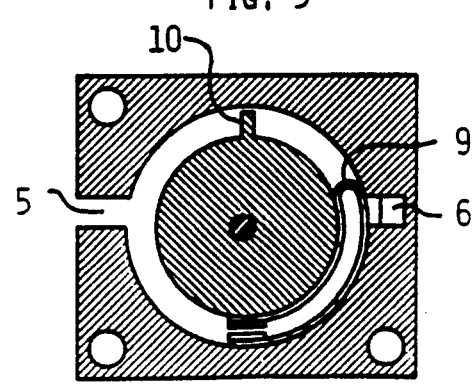
FIG. 6

VALVE APPARATUS

The present invention relates to a valve apparatus, comprising at least one valve device having a valve housing, which forms a chamber with a wall, an inlet to the chamber, and an outlet from the chamber, an elongated flexible membrane with two ends, one end of the membrane being attached to the valve housing, and a movable member situated in the chamber, the other end of the membrane being attached to said movable member. The movable member is arranged to displace the other end of the membrane back and fourth in the chamber, so that the membrane is rolled against the wall of the chamber between a closing position, at which the membrane covers the opening of the outlet in the chamber, and an opening position, at which the opening of the outlet in the chamber is uncovered. A flow passage is formed between the wall of the chamber and the movable member, for a fluid to flow from the inlet to the outlet, when the opening of the outlet is uncovered.

A valve apparatus of this kind is known from for instance WO 82/01924. In the known valve apparatus the movable member has to be activated by means of a driving device of some kind for providing the movement of the membrane by the movable member between said closing and opening positions. Such a driving device consumes a certain amount of energy, which for each adjustment of the membrane has to be supplied to the driving device from a separate source of energy.

The object of the present invention is to provide a valve apparatus of the kind discussed above, which for its operation only requires a relatively small energy supply from a separate source of energy.

This object is obtained by means of a valve apparatus of the kind initially described, which mainly is characterized in that the movable member is provided with an entrainment member arranged to extend into and be displaced in said flow passage during at least a substantial part of the displacement of said other end of the membrane between said closing and opening positions.

This results in the advantage that for the uncovering of the opening of the outlet in the chamber of the valve device, energy from a separate source of energy only needs to be supplied to the valve apparatus until the entrainment member is influenced by a fluid which starts streaming in said flow passage from the inlet to the outlet, as the membrane is displaced from said closing position, so that the opening of the outlet is partly uncovered. Under the influence of said fluid the entrainment member then entrains the movable member, so that the membrane is completely displaced to said opening position.

Preferably, the entrainment member is arranged to be in said flow passage when the membrane just starts uncover the opening of the outlet during the displacement of said other end of the membrane, whereby the influence of the entrainment member on the movable member for entrainment of the latter can be utilized as soon as said fluid starts streaming through the flow passage.

According to an embodiment of the valve apparatus according to the invention an electro-magnetic stepping motor is connected to the movable member for the displacement of said other end of the membrane. Further, a current source is connected to the electro-magnetic stepping motor and adapted to activate the latter to displace the membrane from said closing position, such that the membrane at least is displaced to the extent that it starts uncover the opening of the outlet in the chamber.

Said current source advantageously comprises an electric accumulator, for instance a capacitor. In consequence the electro-magnetic stepping motor can be operated as a generator for charging the electric accumulator during the entrainment by the entrainment member. As a result, the energy for the operation of the valve apparatus substantially can be taken from the flow energy of said fluid, when this flows through said flow passage in the chamber, provided that before the membrane is displaced back from the opening position to the closing position, the flow has ceased in the flow passage in the chamber.

The valve apparatus may for instance comprise one single valve device and be utilized for connection of a source of vacuum to a closed space, the source of vacuum being connected to the outlet of the valve device while the closed space is connected to the inlet of the valve device. The flow which in this case occurs in the flow passage, as the membrane is displaced to said opening position, ceases when vacuum prevails in said closed space. Then the membrane can be displaced without flow resistance back to said closing position.

According to a further embodiment of the valve apparatus according to the invention, the valve apparatus comprises two valve devices, the outlet of one of the valve devices communicating with the chamber of the other valve device and the movable members of the valve devices being arranged to displace said other ends of the membranes, such that the outlet of said one valve device is closed when the outlet of said other valve device is opened and vice versa. Such a valve apparatus with two valve devices may be utilizes as a three way valve.

Suitably, the movable members of said two-valve devices are connected to each other. In consequence, the advantage is obtained that under influence of flow of fluid the entrainment member of one of the valve devices also will entrain the moveable member of the other valve device, so that the latter displaces its membrane towards closed position, and vice versa. Thus, this valve apparatus could be designed totally self-running, i.e. energy enough from a source of pressure connected to the valve apparatus could be transformed to the electric energy required for total operation of the valve apparatus.

Figure 8A:
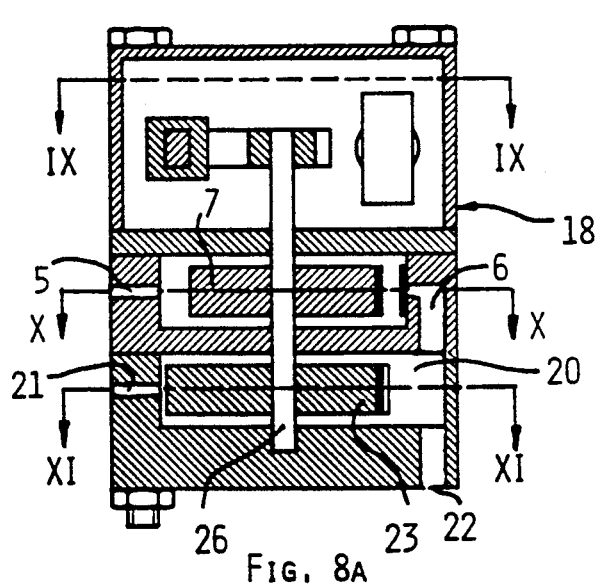

The invention is described more closely in the following with reference to the accompanying drawings, in which FIG. 1 shows a valve apparatus according to the invention comprising one valve device, FIG. 2a shows a view of a section along the line II—II in FIG. 1, FIGS. 3 and 4 show sectional views along the lines III—III and IV—IV, respectively, in FIG. 2a, FIG. 2b shows the same view as that of FIG. 2a, but with the valve device in another adjustment, FIGS. 5 and 6 show sectional views along the lines V—V and VI—VI, respectively, in FIG. 2b, FIG. 7 shows another valve apparatus according to the invention comprising two valve devices, FIG. 8a shows a sectional view along the line VIII—VIII in FIG. 7.

Figure 10:
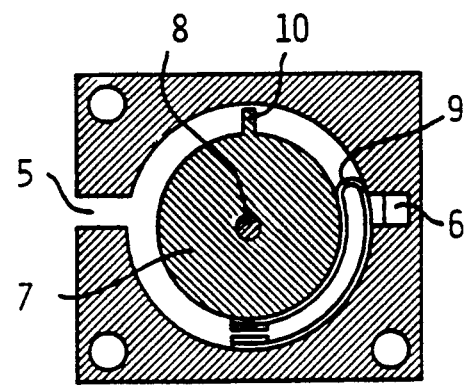
Figure 9:
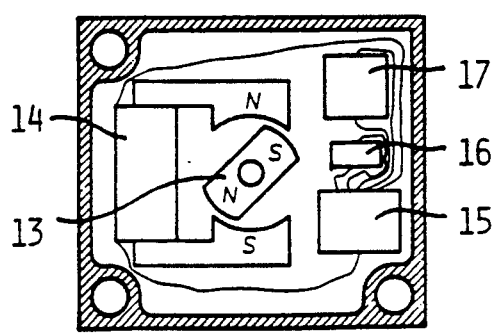
Figure 11:
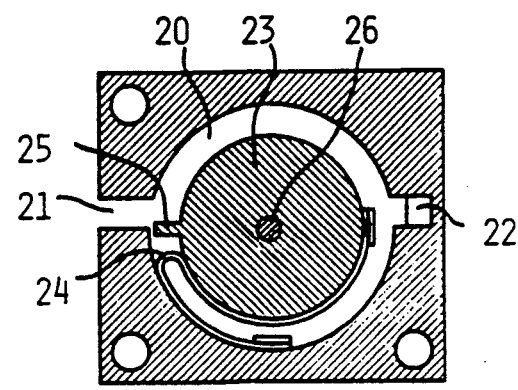
Figure 8B:
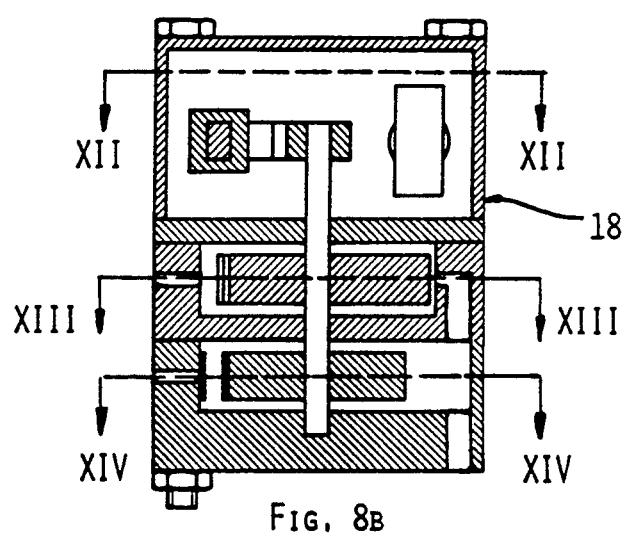
Figure 13:
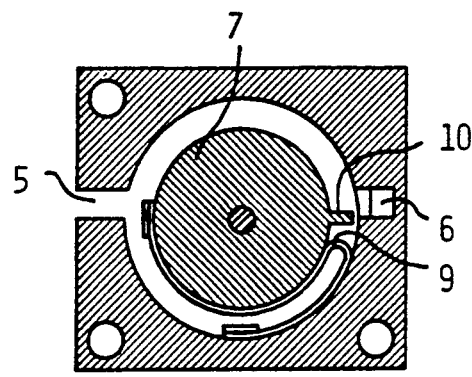
Figure 12:
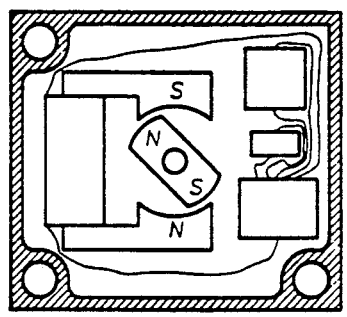
Figure 14:
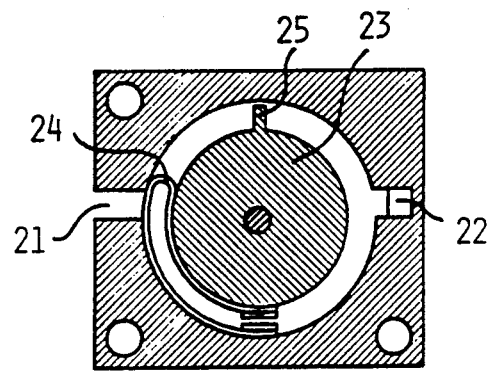

FIGS. 9, 10 and 11 show sectional views along the lines IX—IX, X—X and XI—XI, respectively, in FIG. 8a, FIG. 8b shows the same view as that of FIG. 8a, but with the valve devices in other adjustments, and FIGS. 12, 13 and 14 show sectional views along the lines XII—XII, XIII-XIII and XIV—XIV, respectively, in FIG. 8b.

The valve apparatus 1 shown in FIGS. 1–6 comprises a valve device 2 having a valve housing 3, which forms a chamber 4 with circular cross-section. The chamber 4 has an inlet 5 and an outlet 6, which is situated in front of the inlet 5. (However, it is not necessary that the inlet 5 and the outlet 6 are situated in front of each other). A circular cylindrical body 7 is by means of a shaft 8 pivotally arranged in the chamber 4 coaxially with the latter. An elongated flexible membrane 9, the breadth of which has the same extension (alternatively less extension) as the axial extension of the body 7, has one of its ends attached to the valve housing 3 and its other end attached to the body 7. The membrane 9 is bent 180°, so that a part of the membrane 9 abuts against the mantle surface of the body 7, whereas another part of the membrane abuts against the circular wall surface of the chamber 4. By turning the body 7 back and forth 90° the end of the membrane 9, which is attached to the body 7, is displaced so that the membrane is rolled against the wall of the chamber 4 between a closing position, at which the membrane 9 covers the opening of the outlet 6 in the chamber 4 (FIG. 6), and an opening position, at which the opening of the outlet 6 in the chamber 4 is uncovered (FIG. 4). At said opening and closing positions the body 7 abuts against shoulders on the valve housing (not shown in the drawings), which prevent further turning of the body 7.

The pivoted body 7 is provided with an entrainment member in the form of a wing 10 having the same axial extension as that of the body 7 and extending radially outwards from the body 7 to the close proximity of the circular wall surface of the chamber 4. The wing 10 is oriented on the body 7, so that it at said closing position is right between the inlet 5 and the outlet 6 in the flow passage formed between the mantle surface of the body 7 and the circular wall surface of the valve housing 3 (FIG. 6), and at said opening position substantially has passed the opening of the outlet 6 in the chamber 4 (FIG. 4).

The shaft 8 has an end portion 11 extending into a chamber 12 of the valve apparatus 1. The end portion 11 is connected to a permanent magnet 13, which constitutes a rotor of an electro-magnetic stepping motor 14 arranged in the chamber 12. The stepping motor 14 is connected to a control means 15, which in turn is connected to a rechargeable battery 16 and a capacitor 17.

The valve apparatus 1 functions in the following way:

The outlet 6 is connected to a source of vacuum (not shown) while the inlet 5 is connected to a closed space (now shown) to be evacuated of air. Initially the valve apparatus 1 is at a closed position, as shown in FIGS. 2b, 5 and 6. To adjust the valve apparatus to the opening position shown in FIGS. 2a, 3 and 4, the control means 15 first charges the capacitor 17 with energy from the battery 16. Then the control means 15 activates the stepping motor 14 with a pulse of current from the capacitor 17, so that the rotor 13 is turned clockwise towards the position shown in FIG. 3. The turning of the rotor 13 also results in that the body 7 is turned clockwise by means of the shaft 8. In consequence, the membrane 9 is rolled off successively from the circular wall surface of the chamber 4. When the membrane 9 starts uncover the opening of the outlet in the chamber 4, air from said closed space starts streaming through the inlet 5 in the chamber 4 towards the outlet 6. The air flow in the chamber 4 forces the wing 10 against the outlet 6, whereby the wing 10 entrains the body 7 to the opening position shown in FIG. 4. During the entrainment of the body 7 by the wing 10 the stepping motor 14 acts like a generator, the control means charging the capacitor 17 with electric energy generated by the stepping motor 14.

When said closed space has been evacuated of air the air flow through the chamber 4 ceases, and the valve apparatus 1 can be adjusted back to the closing position shown in FIG. 2b, 5 and 6 by activating the stepping motor 14 by the control means 15 with a pulse of current from the capacitor 17, so that the rotor 13 and the body 7 are turned anti-clockwise a quarter of a revolution back to the closing position shown in FIGS. 2b, 5 and 6. After the adjustment of the valve apparatus 1 to this closing position the capacitor 17 may still have a certain amount of energy left, which means that only a relatively small amount of energy needs to be transferred from the battery 16 to the capacitor 17 at next adjustment of the valve apparatus 1 to the opening position according to FIGS. 2a, 3 and 4. In certain applications it may occur that the capacitor 17 receives so much electric energy generated by the stepping motor 14 that the capacitor 17 can charge the battery 16, whereby the valve apparatus 1 will be selfrunning after an initial adjustment to opening position.

The valve apparatus 18 shown in FIGS. 71 ∝ 14 consists of a valve apparatus 1 according to FIGS. 1–6, which is provided with a further valve device 19. This is formed analogous to the valve device 2 and thus has a chamber 20 with an inlet 21 and an outlet 22, a body 23, which is pivotally arranged in the chamber 20, a membrane 24, and a wing 25 on the body 23. The shaft 8 is extended by a shaft portion 26, to which the body 23 is attached. The bodies 7 and 23 are oriented relative to each other so that the valve device 2 is closed (FIG. 1) when the valve device 19 is open (FIG. 11), and vice versa. The outlet 6 of the valve device 2 communicates with the chamber 20 of the valve device 19.

The valve apparatus 18 may be utilized as a three way valve in the following manner:

The inlet 5 is connected to atmosphere and the outlet 21 is connected to a source of vacuum (not shown), while the inlet 22 is connected to a closed space (not shown), in which atmospheric pressure and vacuum are to prevail alternately. In the positions of the bodies 7 and 23 shown in FIGS. 7–11 said closed space communicates with the source of vacuum, since the outlet 6 is closed while the outlet 21 to the source of vacuum is open. In order to adjust the valve apparatus 18 to the position of the bodies 7 and 23 shown in FIGS. 8b, 12-13, so that said space communicates with atmosphere, the control means 15 activates the stepping motor 14 in the same manner as described above in connection with the function of the valve apparatus 1. As a result, the body 7 is entrained by the wing 10 to the position shown in FIG. 13. Simultaneously the body 23 is turned by the shoulder portion 26 to the position shown in FIG. 14. With the bodies 7 and 23 in the last mentioned positions said closed space thus communicates with atmosphere, since the outlet 21 is closed while the outlet 6 to atmosphere is open.

During the adjustment of the valve apparatus 18 back to the positions of the bodies 7 and 23 shown in FIGS. 8a, 9-11, it is the body 23 which is entrained by the wing 25, whereby the body 7 simultaneously is turned by means of the shaft 8. As a result the capacitor 17 is always charged during each adjustment of the valve apparatus 18. Thus, this will be totally self-supporting of the required electric energy.

The embodiments of the valve apparatus according to the invention shown in the drawings have movable members in the form of pivoted circular cylindrical bodies. However, as an alternative each movable member of a valve apparatus according to the invention may be arranged reciprocatingly.

I claims:

1. A valve apparatus (1;18) comprising at least one valve device (2;19) having a valve housing (3), which forms a chamber (4;20) with a wall, an inlet (5;22) to the chamber, and an outlet (6;21) from the chamber, said outlet having an opening into the chamber, an elongated flexible membrane (9;24) with two ends situated in the chamber, one of the ends of the membrane being attached to the valve housing, and a movable member (7;23) situated in the chamber, the other end of the membrane being attached to the movable member, said movable member being arranged to displace said other end of the membrane back and forth in the chamber, so that the membrane is rolled against the wall of the chamber between a closing position, at which the membrane covers the opening of the outlet in the chamber, and an opening position, at which the opening of the outlet in the chamber is uncovered, a flow passage being formed between the wall of the chamber and the movable member, for a fluid to flow from the inlet to the outlet when the opening of the outlet is uncovered, characterized in that the movable member (7;23) is provided with an entrainment member (10;25) arranged to extend into and be displaced in said flow passage during at least a substantial part of the displacement of said other end of the membrane (9;24) between said closing and opening positions.

2. A valve apparatus according to claim 1, characterized in that the entrainment member (10; 25) is arranged to be in said flow passage, when the membrane (9; 24) just starts to uncover the opening of the outlet (6; 21) during the displacement of said other end of the membrane.

3. A valve apparatus according to claim 2, characterized by an electromagnetic stepping motor (14) connected to the movable member (7; 23) for the displacement of said other end of the membrane (9; 24), and a current source (16, 17), connected to the electro-magnetic stepping motor and adapted to activate the latter to move the membrane (9; 24) from said closing position, such that the membrane at least is displaced to the extent that it starts uncover the opening of the outlet (6; 21) in the chamber.

4. A valve apparatus according to claim 3, characterized in that said current source comprises an electric accumulator (17), whereby the electro-magnetic stepping motor (14) is operated as a generator for charging the electric accumulator during the entrainment by the entrainment member (10; 25).

5. A valve apparatus according to claim 4, characterized in that the electric accumulator is a capacitor (17).

6. A valve apparatus according to claim 1, characterized in that it comprises two valve devices (2; 19), and that the outlet (6) of one of the valve devices communicates with the chamber (20) of the other valve device, the movable members (7; 23) of the valve devices being arranged to displace said other ends of the membranes (9; 24), such that the outlet (6) of said one valve device is closed when the outlet (21) of said other valve device is opened and vice versa.

7. A valve apparatus according to claim 6, characterized in that the movable members (7; 23) of the two valve devices (2; 19) are connected to each other.

* * * * *

UNITED STATES PATENT AND TRADEMARK OFFICE
CERTIFICATE OF CORRECTION

PATENT NO. : 5,238,023
DATED : August 24, 1993
INVENTOR(S) : H. Kristoffer Olofsson It is certified that error appears in the above-identified patent and that said Letters Patent is hereby corrected as shown below:

On the title page, item (75) inventors; "Kristoffer, H. Olofsson Huddinge, Sweden " should read --Hans K. Olofsson, Huddinge, Sweden--.

Item (19) change "Kristoffer" to read --Olofsson--.

Signed and Sealed this

Twenty-sixth Day of April, 1994

Attest:

BRUCE LEHMAN

Attesting Officer

Commissioner of Patents and Trademarks